H. C. STOCKEL.
ARMORED LINER FOR TIRES.
APPLICATION FILED SEPT. 17, 1920.
1,382,565.
Patented June 21, 1921.
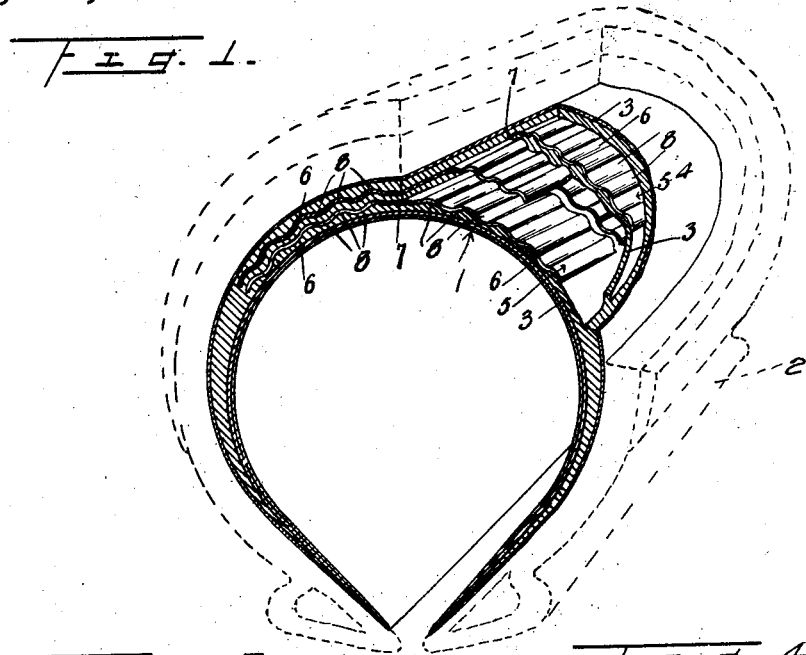
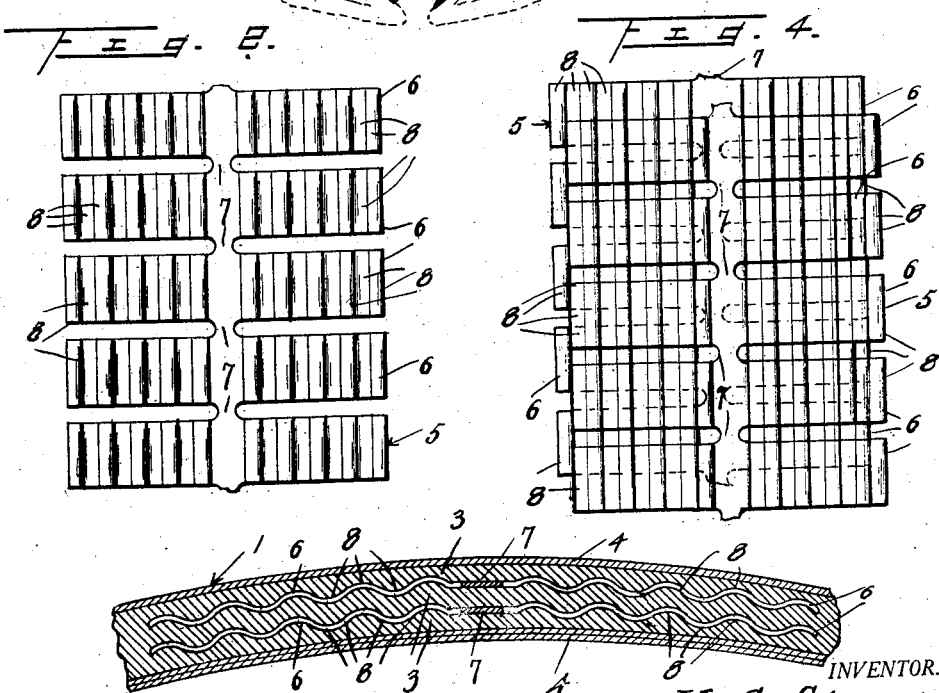
INVENTOR.
H. C. Stockel.
BY
ATTORNEY.

UNITED STATES PATENT OFFICE.

HANS C. STOCKEL, OF CHICAGO, ILLINOIS.

ARMORED LINER FOR TIRES.

1,382,565.  Specification of Letters Patent.  Patented June 21, 1921.

Application filed September 17, 1920. Serial No. 410,892.

*To all whom it may concern:*

Be it known that I, HANS C. STOCKEL, a citizen of the United States, residing at Chicago, in the county of Cook and State of Illinois, have invented certain new and useful Improvements in Armored Liners for Tires; and I do hereby declare the following to be a full, clear, and exact description of the invention, such as will enable others skilled in the art to which it appertains to make and use the same.

This invention relates to new and useful improvements in armored liners for tires of the character employing inner and outer armor elements and each consisting of a plurality of strips arranged transversely and has for its primary object the provision of longitudinally extending tongues formed integrally with the strips for retaining the latter in their proper relation to each other and within the liner and also to facilitate the handling and assembling of the strips in the liner.

Another object of this invention is the provision of corrugations in each strip adapted to prevent a strip when broken from overlapping itself or another strip or from moving or shifting transversely and longitudinally of the liner.

A further object of this invention is the provision of an armored liner for tires of the above stated character, which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which—

Figure 1 is a fragmentary perspective view illustrating a tire with a liner positioned therein and constructed in accordance with my invention, Fig. 2 is a fragmentary plan view illustrating one of the armor elements, Fig. 3 is a fragmentary transverse sectional view drawn on an enlarged scale illustrating the corrugations of the strips and the embedding of the same in a pad or body, and Fig. 4 is a fragmentary plan view, illustrating a modified form of my invention.

Referring in detail to the drawings, the numeral 1 indicates an armored liner adapted to be positioned within a shoe or tire 2 for protecting the usual inner tube against punctures and blow-outs. The liner 1 includes a pad or body which is constructed from plies of crude rubber 3 and rubberized fabric 4. Preferably three plies of crude rubber are used, one ply is placed between inner and outer armor elements 5 and the other two plies of crude rubber are positioned over said inner and outer armor elements, so that the armor elements are nested in a comparatively soft bed or cushion which will permit them to readily flex when in use. The plies of crude rubber 3 are covered by the plies of rubberized fabric 4 and the plies 3 and 4 vary in widths so that when said plies are subjected to a vulcanizing process they will mold into a pad with comparatively thin edges as shown in Fig. 1, and the plies of fabric may be of any desired number so as to afford the desired strength to the liner. The pad is comparatively thick at its portion which underlies the tread of the tire 2 and in which the armor elements are embedded and gradually tapers toward its longitudinal edges so as not to terminate abruptly in the tire and thereby permit the inner tube to rest smoothly thereon without any danger of chafing or injuring the latter.

The armor elements 5 are constructed preferably from high grade steel but any other material may be used, that is suitable for the purpose and each includes relatively spaced and transversely disposed strips 6 connected together at their medial portions by integral tongues 7 that extend longitudinally. The tongues 7 are of a decreased width at their medial portions so that if the tongues are broken during the use of the device they will break at their medial portions and remain attached to the strips, thereby obviating loose particles which would be liable to work through the pad and puncture the inner tube. Each strip is provided with corrugations that extend from each end thereof toward the medial portions and terminate adjacent to the medial portions. The liability of the strips breaking during use is more liable to occur somewhere between the medial portion and the ends where the corrugations are located, and said corrugations being embedded in the plies of crude rubber are adapted to prevent parts of the strips when broken from overlapping each other or the adjacent strips or shifting within the pads either transversely or longitudinally.

The inner and outer armor elements are positioned one over the other in the pad and the strips of one armor element closes the spaces between the strips of the other armor element so as to form a continuous armor for the inner tube. The ends of the strips of the inner and outer armor elements are arranged in alinement with each other as shown in Fig. 3 or one of the armor elements may be shifted transversely of the other armor element as shown in Fig. 4 if desired.

The armor elements being constructed of a plurality of strips permit them to readily flex during the expansion and contraction of the tire and by having the strips connected by tongues permit of them to be more readily handled and assembled in the pad as well as aiding in retaining the strips in their proper relation with each other when embedded in the pad.

While I have shown and described the preferred embodiment of my invention, it will be understood that minor changes in construction, combination, and arrangement of parts may be made without departing from the spirit and scope of the invention as claimed.

Having thus described my invention what I claim is:—

1. An armor for pneumatic tires comprising a plurality of elongated narrow plates of elastic metal, and narrow tongues connecting the plates in strip formation with their longitudinal sides in relatively spaced relation and adapted to hold said plates in spaced relation when the armor is curved transversely.

2. An armor for pneumatic tires comprising a plurality of elongated narrow plates of elastic metal, corrugations formed in said plates and extending from their ends to points adjacent their medial portions, and tongues connecting the plates in strip formation with their longitudinal sides in relatively spaced relation.

3. An armor for pneumatic tires comprising a plurality of elongated narrow plates of elastic metal, corrugations formed in said plates and extending from their ends to points adjacent their medial portions, said corrugations extending above and below the plane of said plates, and tongues connecting the medial portions of said plates and having their medial portions decreased in width so that when broken they will break at their medial portions and remain attached to the plates.

In testimony whereof I affix my signature in presence of two witnesses.

HANS C. STOCKEL.

Witnesses:
 CHAS. GUMBINER,
 ROBT. W. WENDT.